(12) United States Patent
Zietek et al.

(10) Patent No.: US 11,540,532 B2
(45) Date of Patent: Jan. 3, 2023

(54) CONFECTIONERY PRODUCT

(71) Applicant: MARS, INCORPORATED, McLean, VA (US)

(72) Inventors: Mike Zietek, Slough (GB); Kristina Lodaite, Slough (GB); Nicos Charalambous, Slough (GB)

(73) Assignee: MARS, INCORPORATED, McLean, VA (US)

( * ) Notice: Subject to any disclaimer, the term of this patent is extended or adjusted under 35 U.S.C. 154(b) by 306 days.

(21) Appl. No.: 16/484,502

(22) PCT Filed: Feb. 8, 2018

(86) PCT No.: PCT/US2018/017396
§ 371 (c)(1),
(2) Date: Aug. 8, 2019

(87) PCT Pub. No.: WO2018/148390
PCT Pub. Date: Aug. 16, 2018

(65) Prior Publication Data
US 2020/0000116 A1    Jan. 2, 2020

(30) Foreign Application Priority Data
Feb. 10, 2017  (GB) ..................................... 1702247

(51) Int. Cl.
| A23G 1/52 | (2006.01) |
| A23G 1/00 | (2006.01) |
| A23G 1/40 | (2006.01) |
| A23G 1/44 | (2006.01) |
| A23G 1/50 | (2006.01) |

(52) U.S. Cl.
CPC ............... *A23G 1/52* (2013.01); *A23G 1/003* (2013.01); *A23G 1/40* (2013.01); *A23G 1/44* (2013.01); *A23G 1/507* (2013.01); *A23C 2210/30* (2013.01); *A23V 2002/00* (2013.01)

(58) Field of Classification Search
CPC . A23G 1/003; A23G 1/40; A23G 1/44; A23G 1/52; A23G 1/507
USPC ......................................................... 426/568
See application file for complete search history.

(56) References Cited

U.S. PATENT DOCUMENTS

| 4,663,176 A | 5/1987 | Arden | |
| 2009/0181145 A1* | 7/2009 | Pandey | .................... A23G 1/40 426/474 |
| 2010/0143545 A1 | 6/2010 | Mor et al. | |

FOREIGN PATENT DOCUMENTS

| CA | 2665898 A1 | 10/2010 |
| RU | 2201084 C2 | 3/2003 |
| RU | 2337565 C2 | 11/2008 |
| RU | 2414824 C2 | 3/2011 |
| WO | 2013083697 A1 | 6/2013 |
| WO | 2015191708 A1 | 12/2015 |
| WO | 2016061227 A1 | 4/2016 |
| WO | 2016151122 A1 | 9/2016 |

* cited by examiner

*Primary Examiner* — Jyoti Chawla (57) ABSTRACT

A shelf-stable mousse comprising (i) an aerated fat-free composition of a protein whipping agent, water and a sugar syrup, which composition is in admixture with (ii) at least one of a fat-containing substance; wherein the mousse has a water activity of less than 0.75, a hardness of less than 0.8N (measured as the force required to insert a probe to a depth of 7 mm into the mousse), and a loss factor tan δ value of greater than 0.95.

22 Claims, 10 Drawing Sheets

CONFECTIONERY PRODUCT

The present invention relates to a shelf-stable mousse, having an 'in mouth' texture and rheological properties which resembles that of a refrigerated mousse, as well as methods for preparing it and confectionery products containing it.

BACKGROUND OF THE INVENTION

A wide variety of mousses are known in the art. In a domestic kitchen, a mousse may be prepared by aerating a protein containing substance, in particular egg white, to form a solid foam, and then admixing the foam with other ingredients of the mousse including flavourings, sugar and water. However, such processes are not amenable to scaling up to manufacturing proportions. Furthermore, mousses produced in this manner do not have the handling and storage properties that would allow them to be used in large-scale manufacturing processes or shelf-stable confectionery products.

Generally, in the food manufacturing industry, mousses such as those that may be used in products such as confectionery or desserts, are obtained by emulsifying and aerating a mixture of the requisite ingredients including protein, fat, sugars and water. Storage of such products may still be an issue however, and many are kept in a frozen or refrigerated condition. Such products may have a desirable 'mouthfeel' when cold, but become too soft or sticky if allowed to warm to room temperature. They are also usually microbiologically unstable due to their high water activity and/or require aseptic packing.

In order to obtain mousses which can be used in products which are kept at ambient temperature, such as confectionery items like chocolate bars, significant quantities of sugars and/or other preservatives or stabilizers may be required to be added. These can unduly harden or dry the mousses, giving them a less than optimum texture, taste and mouthfeel.

Alternatively, mousse-like textures are obtained by using an aerated fat based "crème" filling. Examples of such fillings can be found in products such as Aero® Mousse block, Lindt® mousse block and Cadbury's® Egg'n'Spoon. These products may have a high fat content, which makes them very energy dense. They may also feel 'greasy' in the mouth, which may not be to all tastes.

Shelf-stable mousses are described for example, in WO2008090203. The mousses in this case are produced using an oil-in-water emulsion, where the oil phase is generally a fat or fat blend, which are then aerated. This results in an aerated emulsion. When examined using for example confocal scanning microscopy, the applicants have found that such aerated emulsions comprise small discrete homogenized oil droplets, which stabilize air bubbles suspended in the continuous phase. The mouthfeel of the mousse is said to be similar to that of a traditional mousse au chocolat, and it is stated that the mousse is shelf-stable, even without the need for preservative. The fat content of such mousses are however quite high, at least 25% and typically from 30-50% w/w.

An alternative shelf stable mousse is described in WO2013/083697. This is a dairy mousse, also in the form of an aerated oil-in-water emulsion. It is stabilized by means of a hydrocolloid-based stabilizer system which is mixed with the ingredients of the mousse before whipping or aeration. However, the water activity of these products is reported to be quite high, of the order of 0.98. This would suggest that the product would have to be packaged aseptically to give it microbiological stability, which may be costly and time consuming.

Applicant has formulated a new shelf-stable mousse which has unique viscoelastic properties for shelf-stable mousse, and which has the specific characteristics of a refrigerated mousse. It may have a relatively low fat and/or dairy content. It may not require aseptic packing.

SUMMARY OF THE INVENTION

According to the present invention there is provided a shelf-stable mousse comprising (i) an aerated fat-free composition of a whipping agent, water and a sugar syrup, which composition is in admixture with (ii) a fat-containing substance; wherein the mousse has a water activity of less than 0.75, a hardness of less than 0.8N (measured as the force required to insert a probe to a depth of 7 mm into the mousse), and a loss factor tan δ value of greater than 0.95.

Parameters such as hardness and loss factor tan δ will be measured at normal or ambient temperatures, for example at about 20° C.

The loss factor tan δ is defined as follows:

$$\tan \delta = G''/G',$$

whereas G" is (shear) loss modulus and G' is the (shear) storage modulus.

The applicants have found that by aerating only a water containing fat-free composition, which is then admixed with fat-containing substance, a beneficial light and soft textured mousse may be produced. It has been found that mousse of the invention will have and retain the light and soft mouthfeel generally only found in refrigerated mousses, even if stored at ambient temperature. However, the mousse is 'shelf-stable' or 'ambient stable' and so retains microbial stability even without aseptic packaging. Furthermore, in sensory tests, the mousse of the invention has shown a higher level of stickiness or 'stringiness' than some other products, and a long residual mouth coat. These characteristics may be interpreted by some consumers as giving the product what may be described as a 'creamy' or cloying texture or taste. This may be appealing to some consumers.

The water-activity of the mousse of the invention is less than 0.75, in particular from 0.4 to 0.7, and for example about 0.68. This ensures that the mousse is shelf-stable and has a good shelf life.

The mousse is also a 'soft' mousse, having a relatively low hardness. Hardness (which may also be referred to as 'firmness') is suitably measured using a texture analyzer as would be understood in the art. A particular method for analyzing hardness is given in the examples below. In a particular embodiment, the hardness or firmness is measured using Stable Microsystems texture Analyser TA-HD plus equipped with 500 g load cell. The compression test is carried out using a 10 mm diameter stainless steel probe and penetrating mousse samples deposited in the plastic 210 ml pots. The main set-up parameters are illustrated hereinafter. Hardness or firmness is measured as the maximum penetration force (N) at the deformation depth of 7 mm.

In a particular embodiment, the hardness of the mousse of the invention is for example, less than 0.79N, for example from 0.1-0.3N. This is generally less than the hardness found in shelf-stable mousses or nougats.

The rheological or viscoelastic properties of the mousse of the invention are unique in a soft mousse. The loss factor tan δ, at a value of at least 0.95 and preferably at least 1, for example from 0.95 to 2 or from 1 to 2, is generally higher than that of conventional mousses, and indicates that the nature of the mousse of the invention is one of a liquid rather than a gel or solid. Typically therefore, the value of the loss modulus G" is greater than the value of the storage modulus G', which indicates that the mousse behaves more as a viscous liquid, rather than an elastic material. This is different from most conventional mousses available. Such properties appear to have a direct impact on the sensory properties of the mousse such as the 'stringiness' or 'stickiness', and may give rise to a cloying or 'creamy' texture or taste as described above.

Other rheological properties may also have an impact on the texture and therefore the sensory perception of the mousse of the invention. The absolute shear modulus G* is the ratio of the amplitude of the stress to the amplitude of the strain in a forced oscillation. In a particular embodiment of the mousse of the invention, the modulus G* is low, in particular it is less than 60 kPa, such as less than 50 kPa, or less than 40 kPa or 30 kPa and suitably less than 25 kPa, for example less than 10 kPa, such as from 1-5 kPa.

These parameters can be measured using conventional methods which would be understood by the person skilled in the art. For example, the rheological properties of samples, such as storage modulus G', loss modulus G" and loss factor tan δ may be measured using for example a TA Instruments rheometer Discovery DHR-2 at a controlled temperature of, for example, 20° C., as set out in the Examples below. The (shear) storage modulus G* may then be calculated from the results as follows:

$$G^* = (G'^2 + G''^2)^{0.5}$$

Sensory trials, as detailed below, show a remarkable correlation between the rheological properties and the nature of the mousse in the mouth. In particular, mousses of the invention have been found to show a higher level of stickiness and stringiness, than other similar products, and a long-lasting sensation.

In a particular embodiment, the mousse of the invention has a volume fraction of air of from 30% to 60% by volume, and typically from 35-58% by volume, such as about 54% by volume. This is similar to or less than is found in some shelf-stable mousses, such as mallows, currently available, which have a higher air content to retain softness in texture. However, mallows of this type may not support significant amounts of flavouring. However, the applicants have found that they may reduce the amount of air as described above, so that a good flavouring profile may be achieved, without unduly increasing hardness.

The reason for these beneficial properties is not fully understood, but examination by confocal microscopy suggests that the underlying structure of the mousse is different from those produced by conventional manufacturing methods. Rather than stabilizing air bubbles in the continuous phase as would occur in a mousse based upon an oil-in water emulsion, fat particles present in the mousse of the invention may be distributed randomly throughout the continuous phase. Depending upon the nature of any fat-containing substance applied, fat particles may be larger than those found in an emulsion, and they may be of irregular shape.

Sensory testing has shown that the modification is generally effective to reduce the speed of melt in the mouth of the mousse, so that the mouthfeel is long-lasting.

Mousses of the invention will generally have a 'stickiness' of less than 0.5N. In this context, stickiness may be measured using a texture analyzer, as exemplified below. In particular, the stickiness is measured using the same probe to that described above for hardness, and the stickiness measure is taken as the force required to remove the probe from a depth of 15 mm.

In a particular embodiment, the texture achieved is suitably one which is 'spoonable' but still has a thick texture.

In a particular embodiment, the amount of fat-containing substance present in the mousse is at least 5 wt %, for example from 5-30 wt % and suitably from 10-20 wt %.

The product of the invention is 'moisture continuous', in so far the composition of (i) forms a continuous phase throughout the mousse, and this is moisture based. Therefore this has a lower calorie or energy density than a corresponding 'fat-continuous' product.

As used herein, the term 'mousse' refers to an edible foam.

The expression 'shelf-stable' refers to products with are physically stable so that they retain aeration at ambient temperature. They are also microbiologically stable, so that they can be stored at ambient temperature for extended periods without spoilage. Thus for instance, shelf-stable products will have a shelf life of at least 3 months and suitably longer for example up to 2 years, for example up to 1 year. A major factor that affects the shelf-stability of products is water activity as discussed further below.

As used herein, the term 'fat-free' means that there is substantially no fat present in the relevant composition. Thus the first fat-free aerated composition is prepared without any added fat, although there may be some small quantities of fat, inherently present in the composition, for example as a result of the use of a whipping agent which may contain some fat. This will generally be at very low levels such as less than 0.5 wt %.

The term 'fat' refers to lipids in particular edible lipids, including fatty acids, oils, waxes, sterols and triglycerides.

The term 'sugar' refers to mono-saccharides, di-saccharides (such as sucrose) or oligosaccharides, saccharide containing-syrups such as glucose or other syrups containing other mono-, di- or oligosaccharides, as well as sugar alcohols (or polyols) such as sorbitol, maltitol, glycerol or isomalt.

As used herein, the term 'stabilizer' refers to a substance which stabilises or sets the physical structure of the mousse. Examples may include agar, gelling agents such as gelatin, carrageenan, hydrocolloids, or other stabilizers.

As used herein, the expression 'whipping agent' refers to any edible material which may be whipped to form an aerated mass.

The mousse of the invention may additionally comprise a stabilizer such as agar or another gelling agent such as gelatin, carrageenan or other hydrocolloids. Where present, the stabilizer is present in an amount of no more than 1 wt %, for example from 0.4 to 0.8 wt %. However, the stabilizer may be dissolved or dispersed in a carrier such as a syrup, for example a flavouring syrup or jam. In such cases, the carrier including the stabilizer may be present in similar amounts to those listed above for the fat-containing substance.

In a particular embodiment however, the mousse of the invention does not comprise or substantially free of a stabilizer of this type. The term substantially free as used herein indicates the mousse contains less than 0.5 wt % of a stabilizer.

Suitably the mousse will comprise a fat-containing substance as element (ii) above, and this is suitably a fat-containing flavouring such as chocolate, caramel, fruit or nut flavouring, a vanilla, dairy, malt, or coffee flavouring or combinations thereof.

In a particular embodiment, the fat-containing flavouring is a chocolate flavouring, such as cocoa mass/cocoa liquor, chocolate (dark, milk or white), or a mixture of vegetable/dairy fat and cocoa powder/cocoa butter (herein called a "slurry"), or combinations thereof.

In a particular embodiment, the fat or fat-containing substance is a non-dairy fat, such as cocoa fat.

Any fat or fat-containing substance is suitably present in an amount of less than 30% wt, preferably from 0.5 to 20 wt %, more preferably 5 to 15 wt %.

The density of the mousse of the invention will be impacted by the volume fraction of air present. Typically, where the volume fraction of air is from 45% to 60% in accordance with the invention, the density is less than 1 g/ml, for example from 0.5 to 0.8 g/ml, such as about 0.6 g/ml, but this will vary depending upon the precise composition of the mousse.

Additionally, the mousse of the invention may also include additional admixtures, which may be added in order to modify the properties of the mousse, as required. If desired, the mousse of the invention may further contain hygroscopic entities (such as spray-dried glucose) that will firm up the mousse on storage as moisture is attracted away from the mousse, thus making possible a chocolate shell moulded nougat-style product. Similarly, if desired there could be addition of caramel, crème fillings, fruit gels/syrups, or other confectionery fillings.

In a particular embodiment, the rheology of the mousse is such that it may be deposited, for example into a mould, for example a moulded chocolate shell. Other types of product, such as nougats are too hard to be deposited in such a manner because the raised temperature required to move the nougat through the depositor would be a temperature at which the moulded chocolate shell would likely be detempered or melt upon contact with the nougat. Depositing of the mousse of the present invention may be achieved by various means, including the use of humectants, or, in a particular embodiment, by controlling the amount of water present in the mousse. Suitably, the mousse will contain from 10 to 25 wt % water, for example about 16 wt % water. If necessary, the temperature of the mousse may be elevated to facilitate deposition. Temperatures used should not be high enough to damage or otherwise interfere with the components of the mousse, and so will not generally exceed 40° C.

Suitable whipping agents for use in the mousse of the invention, are proteins, including milk protein, egg protein or a mixture thereof. For dairy-free mousses, the proteins are suitably egg proteins. The whipping protein will suitably be present in the mousse in an amount of from 0.6 to 1.5 wt %. Other suitable whipping agents are hydrocolloids such as Agar which are carbohydrate based, suitably present in an amount from 0.4 to 0.8 wt %. The preferred whipping agents of the invention are proteins.

Suitable sugar syrups for use in the mousse of the invention are prepared by mixing a sugar such as granulated sucrose or sugar alcohol such as sorbitol, maltitol or isomalt with sufficient water to form a solution, which sugar solution is formed into a 'base syrup' or 'doctor syrup' by addition of glucose syrup and optionally other ingredients such as salt. In a particular embodiment the base syrup is pure glucose syrup. It is then generally necessary to subject the base syrup to a heating or cooking procedure to remove at least some of the water before the syrup is of an appropriate concentration to go forward to the subsequent processing stages. The concentration of the base syrup is in the range of 67 to 90 wt %.

The whipping agent of choice is allowed to hydrate in suitable sugar syrup which could comprise granulated sugar or sugar alcohol. Suitable syrups might include glucose syrup, sucrose or other sugar syrups and sugar alcohols, such as sorbitol, maltitol or isomalt. Additionally at this stage any stabilizers may be added. In a particular embodiment the whipping solution comprises egg protein, glucose syrup and water.

According to a further aspect of the invention, there is provided a method for preparing a shelf-stable mousse as defined above, said method comprising:
 i) forming a hot base syrup from a sugar syrup or solution;
 ii) forming a whipping solution by creating a mixture of a whipping agent, water and sugar syrup;
 iii) mixing the base syrup at elevated temperature with the whipping solution to form a mixture;
 iv) aerating the mixture of whipping solution and base syrup to form an aerated frappe; and
 v) mixing the aerated frappe with a fat-containing substance in solid or liquid form.

Suitably, the base syrup is formed by heating a sugar syrup or solution, for example to temperatures of from 100-150° C., such as from 111-116° C., typically to the boiling temperature of the desired base syrup, for example at about 112° C. The solids content of the final base syrup will depend upon factors such as the amount of water used in the whipping solution, but will typically be in the range of 80-85 wt %. A doctor syrup, for example of glucose syrup, may be required to ensure that sugars present remain in a non-crystalline or amorphous state.

In a particular embodiment, a whipping agent is first mixed with water and sugar syrup and the mixture allowed to stand for a sufficient period, for example from 30 minutes to 2 hours and suitably about 1 hour, to ensure that the whipping agent, such as the protein is hydrated, and is referred to as a 'whipping solution'.

The base syrup is then suitably mixed with the whipping solution at elevated temperature, for example, at temperatures of from 100-150° C. In a particular embodiment, the base syrup is prepared as described above and mixed directly with the whipping solution in step (iii), while it is still hot. Alternatively, the base syrup may be subjected to a preliminary heating or cooking step to ensure that it is at an elevated temperature. The mixture is then aerated using conventional methods, to form a frappe in step (iv) above. Suitably the density of the frappe at this stage is from 0.2 to 0.4 g/ml, for example from 0.25 g/ml to 0.35 g/ml. The volume of air present in the frappe at this stage is greater than the volume of air present in the final mousse. This is because some air will inevitably be lost on mixing with the fat-containing substance composition.

After partial cooling, for example to temperatures in the range of from 30-40° C., the fat-containing substance is simply stirred into the frappe to provide a mixture in which the fat-containing substance is evenly distributed. Stirring at this stage is suitably carried out in a relatively gentle fashion, so the fat-containing substance, which is either in the form of a solid, or a liquid, for example, a slurry, may be simply folded into the frappe. In a particular embodiment, the fat-containing substance is in liquid form. Suitable apparatus for carrying out this process may include static mixers, where the material flows through a series of stationary baffles, in order to effect mixing.

If required, the mousse may, at this stage, be deposited into a container, such as a chocolate shell or a plastic container, or it may be formed into slabs, if necessary after suitable chilling or freezing. In that case, any slabs may be used in the production of products, for example, they may be enrobed in chocolate to produce enrobed chocolate products.

Further cooling will result in a shelf-stable mousse of the invention. In a particular embodiment, the mousse is cooled in a chocolate shell to form a product. However, in alternative embodiments, the mousse may be cut, slit and/or enrobed in for example chocolate or other coating materials, to form an alternative product. In yet another embodiment, the mousse may be used in a 'one-shot' depositing process together with a coating material, to form a product.

The mousse of the invention may further be combined in product designs with additional non-mousse components such as caramels, syrups, or other confectionery fillings such as fondants, cremes or emulsions. It would also, with suitable gelling, be suitable for enrobed chocolate products.

Thus, in yet a further embodiment, there is provided a confectionery product comprising a shelf-stable mousse as described above.

DETAILED DESCRIPTION OF THE INVENTION

The invention will now be particularly described by way of example, with reference to the accompanying figures in which.

EXAMPLE 1

Preparation of Mousse

A mousse was prepared using the following ingredients:

|  |  | % |
|---|---|---|
| Whipping solution | Water | 2 |
|  | Albumen | 1 |
|  | Glucose syrup 69DE | 17 |
| Base Syrup | Glucose syrup 69DE | 70 |
| Flavouring | Cocoa Liquor | 10 |

Specifically, a hydrated whipping solution was prepared by mixing water, albumen and glucose syrup 69DE in the above-mentioned proportions. The mixture was left for 1 hour in a refrigerator at 4° C.

The whipping solution was added to a whipping chamber of a Ter Braak Preswhip mixing machine and the chamber was closed.

A base syrup was prepared by heating glucose 69DE syrup to 112° C. When the base syrup reached temperature, it was dosed into the whipping chamber with the beater rotating at 50% speed. The mixture was whipped under 3 bar pressure (compressed air) at 100% speed, with the cooling jacket set to 5° C. Aerated frappe was recovered from machine after the 15 minutes. At this stage, the protein content of the frappe was 0.89 wt %, and it had a density of from 0.25 g/ml to 0.35 g/ml.

The cocoa liquor was then folded through the frappe by hand using spatula. The resultant mousse was allowed to cool to 35-40° C. before being deposited into chocolate shells. The density of the mousse was 0.64 g/ml, and it had a water activity of 0.62.

EXAMPLE 2

Alternative Preparation Method

Figure 1:
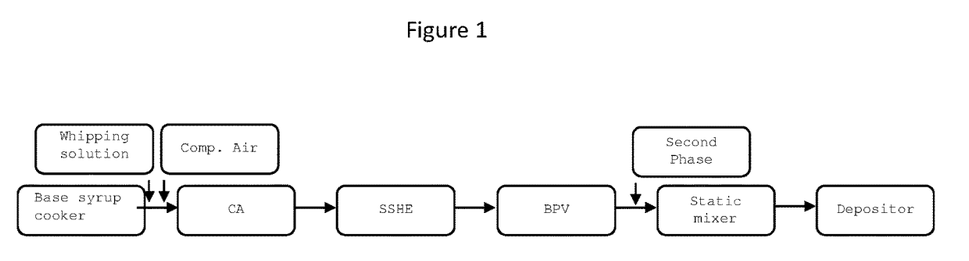
FIG. 1 shows a schematic of a process according to the invention.

A mousse comprising similar ingredients to those described in Example 1 above was prepared on a larger scale in a pilot plant as illustrated in FIG. 1.

As before, a hydrated whipping solution was prepared by mixing water, albumen and glucose 69DE in the above-mentioned proportions and left for 1 hour in a refrigerator at 4° C. In this case however, the base syrup was prepared by heating glucose 69DE syrup to 112° C. in a syrup cooking plant.

Once at temperature, the syrup was pumped to a continuous aerator (CA) (Mondo-Mix). An appropriate quantity of the hydrated whipping solution and compressed air was injected into the flow just prior to entry into the aerator.

The contents then flowed into a scraped surface heat exchanger (SSHE) to cool the mixture to 30-40° C.

The back-pressure valve (BPV) of the aerator was adjusted to 3 bar. By appropriate adjustment of the rotational speed, cooling & back pressure, a frappe of density of 0.3 g/ml between 35-40° C. was obtained in a continuous process.

The continuously produced frappe is admixed with an appropriate amount of the flavouring before flowing through a static mixer. After mixing, a pressurised depositor was used to deposit the resultant mousse into pre-prepared chocolate shells.

After cooling, the chocolate shells were backed off using tempered chocolate and further cooled to form a product.

Sensory testing of the mousse within the chocolate shells was carried out after 4 and 45 weeks in storage. In all tests, all samples were found to be within the range of reference, so the mousse of the invention appears to be highly shelf-stable.

EXAMPLE 3

Comparison of Physical Properties of Mousses

The physical properties of a range of mousses or related confectionery products were investigated. The mousses or mallows tested are set out in Table 1:

TABLE 1

| Mousse | Designation |
| --- | --- |
| Ambient Stable Mousse of the invention including a Caramel flavouring | ASM Caramel |
| Ambient Stable Mousse of the invention including a chocolate flavouring | ASM Chocolate |
| Ambient Stable Mousse of Example 1 | ASM Example 1 |
| Aerated frappe used in the preparation of the Ambient Stable Mousse of the invention | ASM Frappe |
| Ambient Stable Mousse of the invention including a Gelled chocolate flavouring | ASM Gelled choco |
| Ambient Stable Mousse of the invention including a Mars ® standard flavouring | ASM Mars ® SO |
| Emulsion Mousse (Galaxy ® mousse) | Emulsion Galaxy ® |
| Nougat as found in Milky Way ® product | Nougat Milky Way ® |
| Refrigerated Aero ® Mousse | Chilled Aero ® M'se |
| Ptasie Mieczko ® product | Gelled P Mieczko |
| Tunnocks ® tea cake mallow | Mallow Tunnocks |
| Fat-based Cream - Cadbury 'Egg and Spoon' ® | FBC Egg and Spoon ® |

Figure 2A:
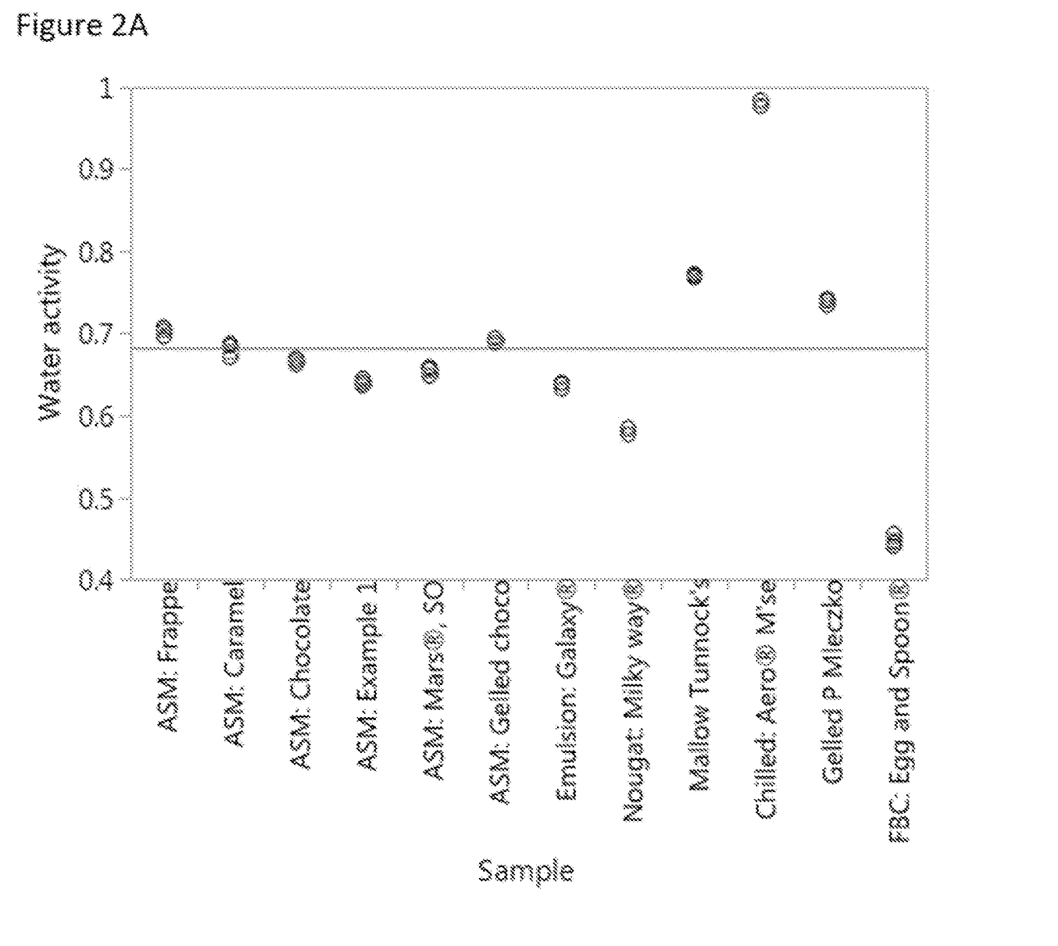
FIG. 2 is a series of graphs showing comparative values of (A) water activity (B) moisture content (C) volume fraction of air (D) hardness/firmness (E) stickiness (F) (shear) Storage modulus G' (G) (Shear) Loss modulus G" (H) Absolute shear modulus G* (I) G' and G" values shown on the same graph where crosses show G' and filled circles show G" values and (J) shows values of loss factor, tan δ for a range of mousses and mallows including mousses of the invention, a refrigerated mousse and commercially available shelf-stable mallows.

The water activity of each of these mousses was measured using Aqualab Series TE DUO 4 machine (Decagon Devices, Inc., USA). The calibration of the instrument was performed using 8.57 M LiCl solution. Mousse samples before were placed into small water activity pots and the measurement was carried out at 20° C. The samples were read in duplicate with an average value reported out. Results shown in FIG. 2A indicate that the mousse of the invention has a water activity below 0.75, in line with those of highly shelf stable mousses and far below that of refrigerated mousses.

Figure 2B:
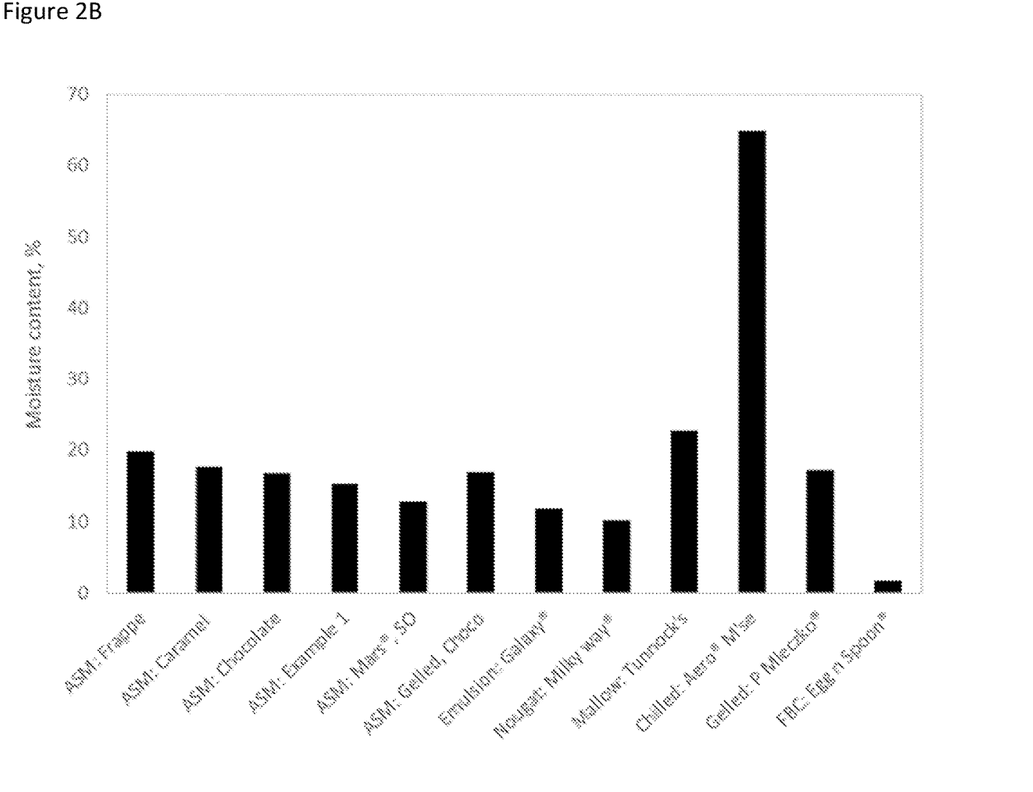

Moisture content in the samples was measured in triplicate using Karl Fischer method. The Turbo2 autotitrators (ThermoFisher Scientific, UK) were used to perform volumetric titrations using a single component Aquastar Composite 5 titrant (EMD chemicals) and methanol as the solvent with potentiometric end point determinations. Mougat samples were accurately weighed using an analytical balance (Mettler-Toledo, UK) after which they were transferred into the titration vessel, and blended at high speed (7500 rpm) for 5.5 min before beginning the titrations. The results are shown in FIG. 2B. The moisture content of the mousse of the invention was less than that of a refrigerated mousse.

Figure 2C:
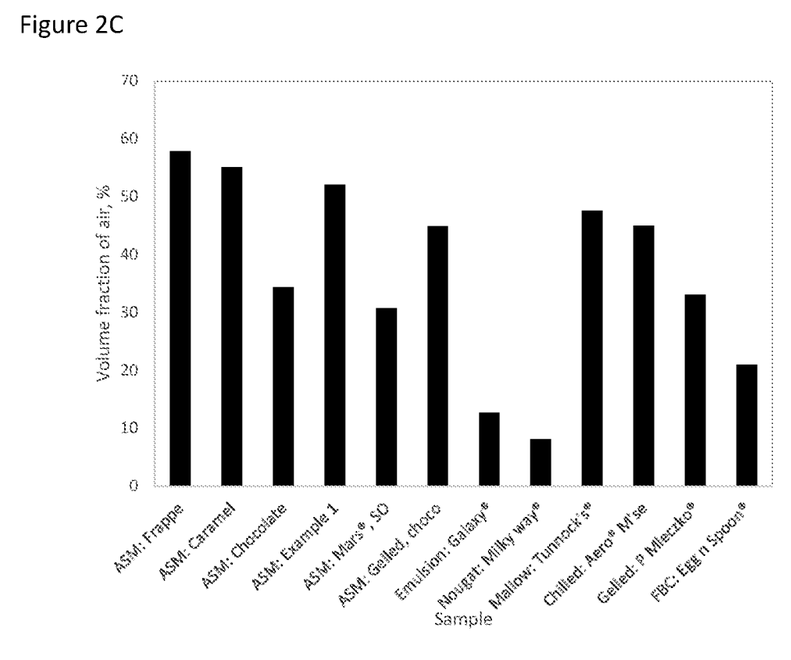

The volume fraction of air of each of the products was then analysed using X-ray microtomography. Specifically, the volume fraction of air was determined by using Skyscan X-ray micro-computed tomographic scanner (Bruker, UK). The samples were scanned inside the 32 ml pots. A median filtering operation was performed to remove the noise. The scan settings used were:
  scan resolution: 10.97 μm/pixel
  X-ray settings: 50 kV source voltage, 100 μA source current, 2×2 binning mode
  Scan settings: 0.4° rotation steps, 226° rotation Results are shown in FIG. 2C.

Texture was then analysed using a texture analyser. The firmness and stickiness of the samples was measured using Stable Microsystems texture Analyser TA-HD plus equipped with 500 g load cell. The compression test was carried out on by using 10 mm diameter stainless steel probe and penetrating the samples deposited in the plastic 210 ml pots. The main set-up parameters were:
  mode: compression
  option: return to start
  test speed: 1 mm s$^{-1}$
  post-test speed: 5 mm s$^{-1}$
  target mode: distance
  distance: 15 mm
  trigger type: button
  data acquisition rate: 200 pps The firmness was measured as the maximum penetration force (N) at the deformation depth of 7 mm whereas the stickiness was determined as the maximum required to withdraw the probe after deformation at 15 mm.

Figure 2D:
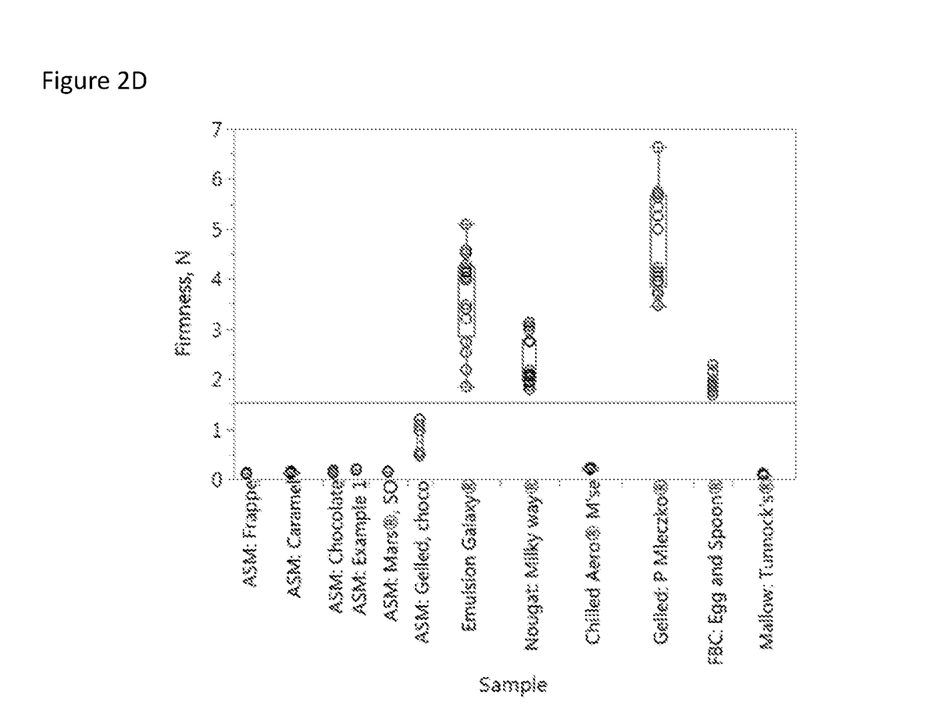
Figure 2E:
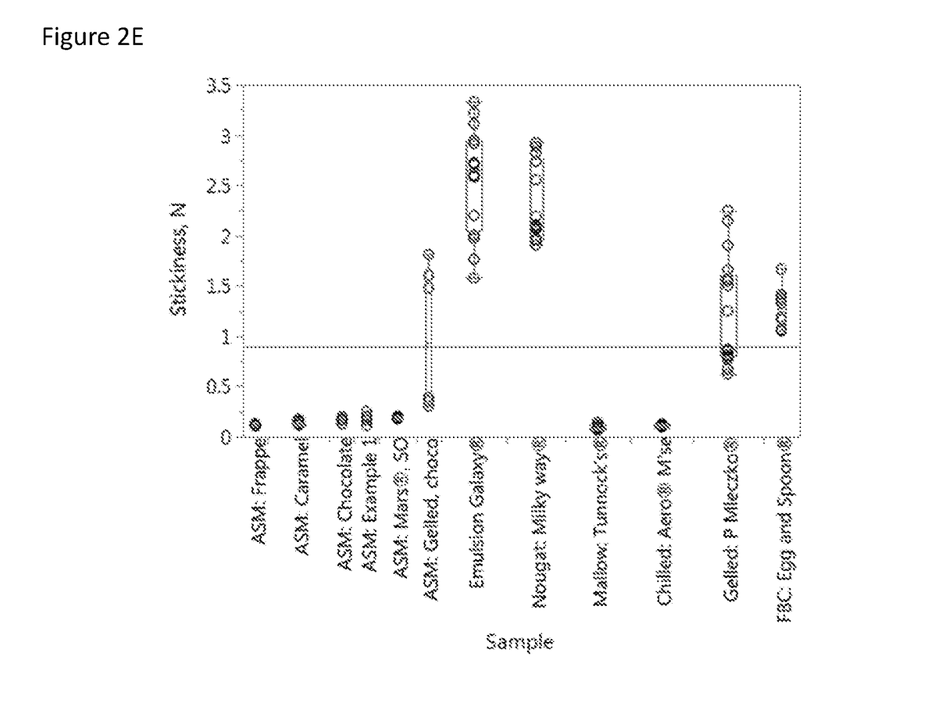

Results for the firmness are shown in FIG. 2D and for stickiness are shown in FIG. 2E. In this case, the hardness of and stickiness of the mousse of the invention was comparatively low, indicating that the texture of the mousse of the invention more closely resembles that of a soft mallow or refrigerated mousses than the commercially available shelf stable products.

Viscoelastic properties were then analysed using a rheometer. The rheological properties of samples, such as storage modulus G', loss modulus G" and loss factor tan δ of the samples were measured using TA Instruments rheometer Discovery DHR-2. The amplitude sweep measurements may be carried out using 40 mm diameter crosshatched plates at a temperature of 20° C. The gap size of 2 mm was maintained during measurements. The amplitude sweep measurements were carried out by progressively increasing the amplitude in logarithmic fashion from 0.01 to 100% at the frequency of 1 Hz and measuring 5 points per decade. Each sample was carefully loaded into the rheometer and allowed to rest for 20 min before the measurement. The G' and G" values were determined from the linear viscoelastic region of the curve G', G" as a function of the amplitude. The value of the absolute shear modulus G* was also calculated.

Figure 2F:
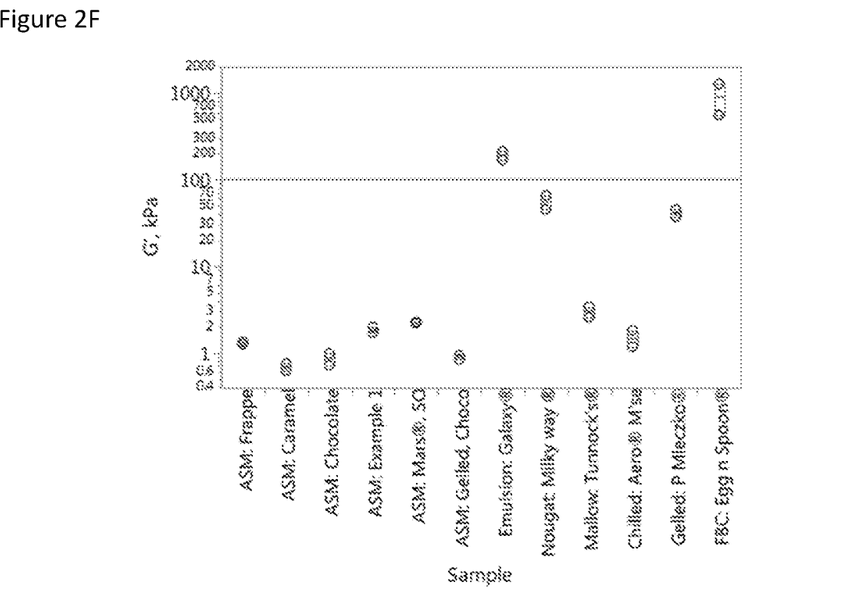
Figure 2G:
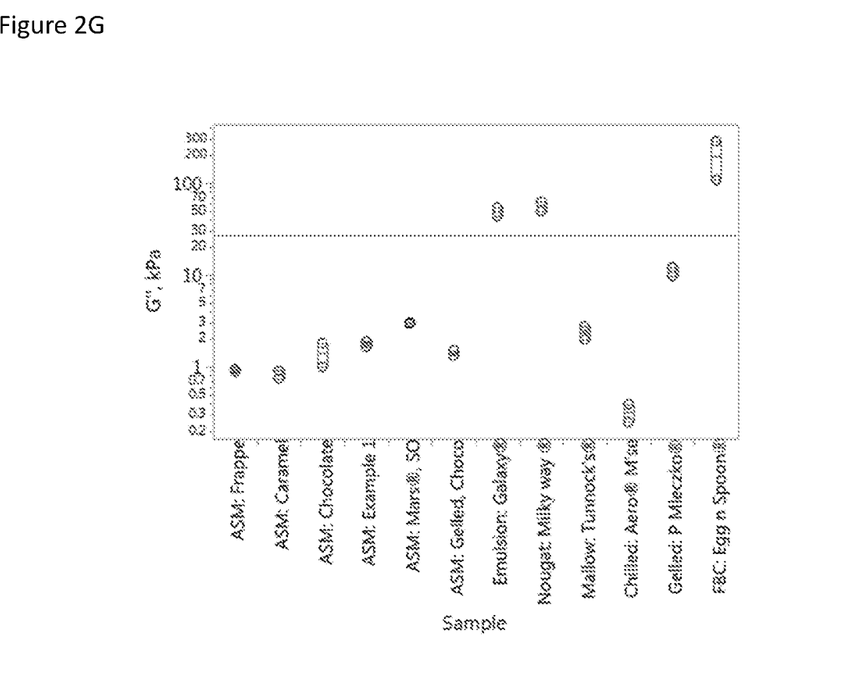
Figure 2H:
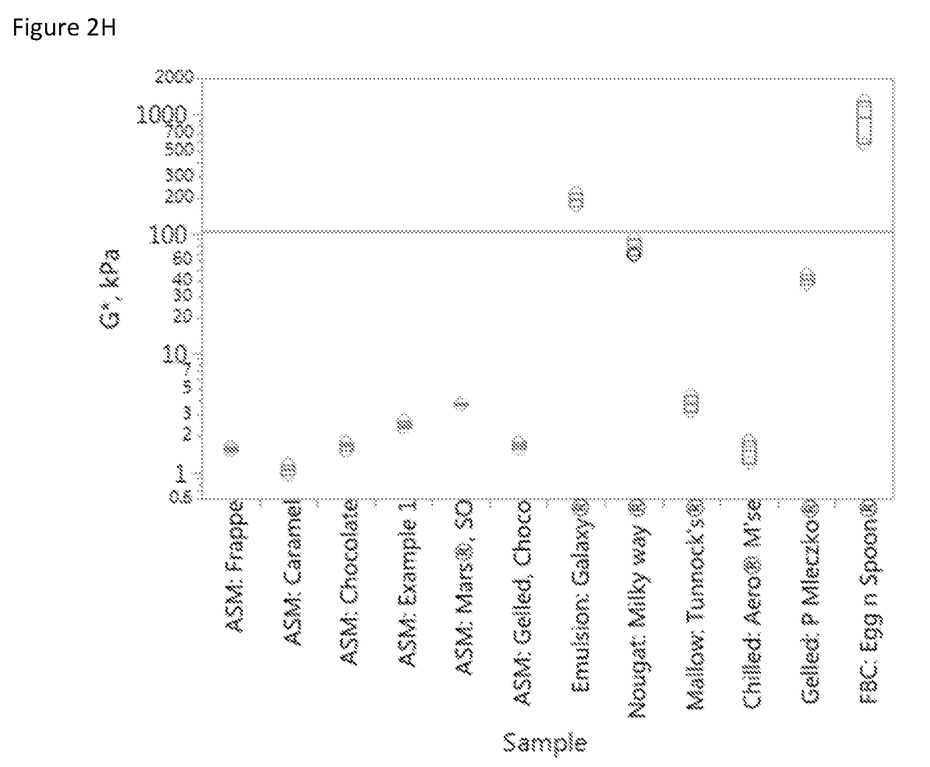
Figure 2I:
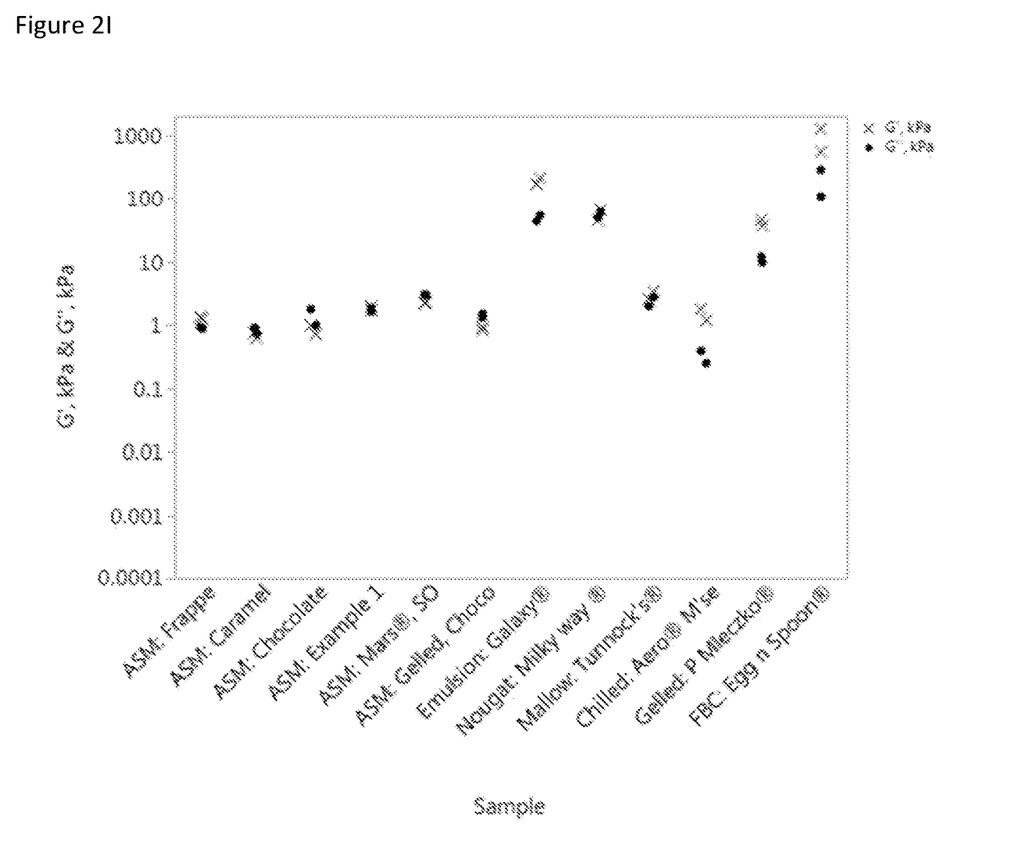

Results for the storage modulus G' are shown in FIG. 2F, for loss modulus G" in FIG. 2G and for absolute shear modulus G* are shown in FIG. 2H. In this case, the mousse of the invention was similar to that of many shelf stable products, indicating that it may be handled in a manufacturing environment. However, when the values of G' and G" were compared (FIG. 2I), this showed that the mousses of the invention were distinct in that the value of G" was generally higher than that of G'. This reflected in them having loss factor, tan δ values of close to or greater than 1 (FIG. 2J). This is indicative that the mousses of the invention will be more viscous and less elastic than other conventional mousses.

Figure 3:
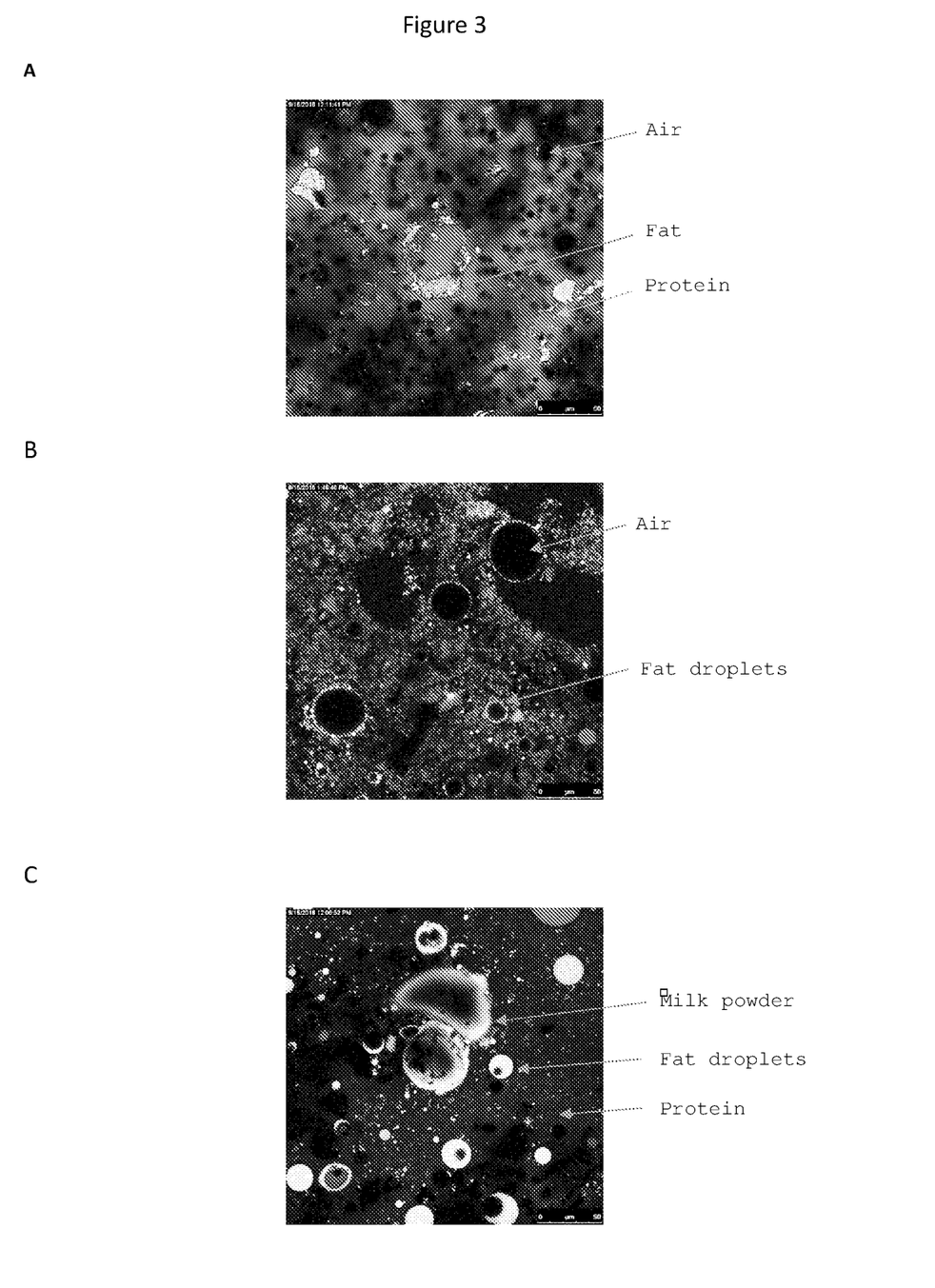
FIG. 3 is a series of confocal micrographs showing (A) a mousse of the invention; (B) a commercially available refrigerated mousse (Aero® mousse), (C) a commercially available shelf-stable aerated mallow (Milky Way® nougat)

The products were also imaged using confocal laser scanning microscopy. Representative results are shown in FIG. 3. It is clear from this Figure that the fat content in the mousse of the invention is present in largely irregularly shaped agglomerations, in contrast to the generally much smaller circular globules found in a mousse derived from an emulsion.

EXAMPLE 4

Sensory Testing

The mousses of the invention and other mousse products were subjected to a testing using an independent trained sensory panel. The products tested were those listed in Table 1 above, with the exception of FBC Egg and Spoon, which was replaced with a different fat-based cream, specifically, Lindt Petit Dessert® Mousse au Chocolate, Noir, designated as 'FBC Lindt M.Se'.

All panellists received about 10 hours training to become familiar with the different products to be tested and with the vocabulary. Each panelist was assessed during the training and those panelists showing acceptable levels of discrimination, repeatability and consensus were used in an analysis. The panel was asked to rate each product on the range of texture attributes set out in Table 2:

TABLE 2

| Attribute Name | Long description | Left Anchor | Right Anchor |
|---|---|---|---|
| Stringy | Degree to which the sample pulls away from your mouth | Nil | Extreme |
| Aerated | Amount of air present in the sample | Dense | Aerated |
| Resistance to bite | Degree to which the sample resists deforming or bending under the incisors | Nil | Extreme |
| Speed of breakdown | Speed at which the sample breaks down | Slow | Fast |
| Sticky | Degree to which the sample sticks around the mouth | Nil | Extreme |
| Chew amount | Number of chews needed to get the sample ready to swallow | Nil | Extreme |
| Thick | Measure of how "thick" the sample is during chew down | Thin | Thick |
| Moist | How wet your mouth feels while chewing the sample | Dry | Moist |
| Speed of melt | How fast the sample goes from solid to semi solid | Slow | Fast |
| Powdery | Amount of fine particles (sand-like) on the surface of the mass measure by rubbing on the palate | Not powdery | v. powdery |
| Residual mouth coating | Amount of coating (=film) on the mouth surface, i.e. palate, cheeks and gums | Nil | Extreme |
| Tooth pack/Stick | Amount of material impacted in the teeth crevices and crowns, or stuck on the teeth | Nil | Extreme |

Each panelist was asked to rate all samples in a fully randomized sample set across three repetitions.

To look at the products through a holistic approach while being able to compare products, the sensory common approach of PCA then clustering was applied to the results obtained. A correlation PCA was first performed on the attributes which were significant at 20% in the mixed model ANOVA. Then a Hierarchical Clustering was performed on the principal components. To select an appropriate number of clusters, three criteria were taken into account:
1) The level of inertia explained.
2) The ratio between inter cluster variance vs intra cluster variance.
3) The ability of a cluster to be discriminated from the others by at least one attribute (significant p-value in a v-test).

Figure 4:
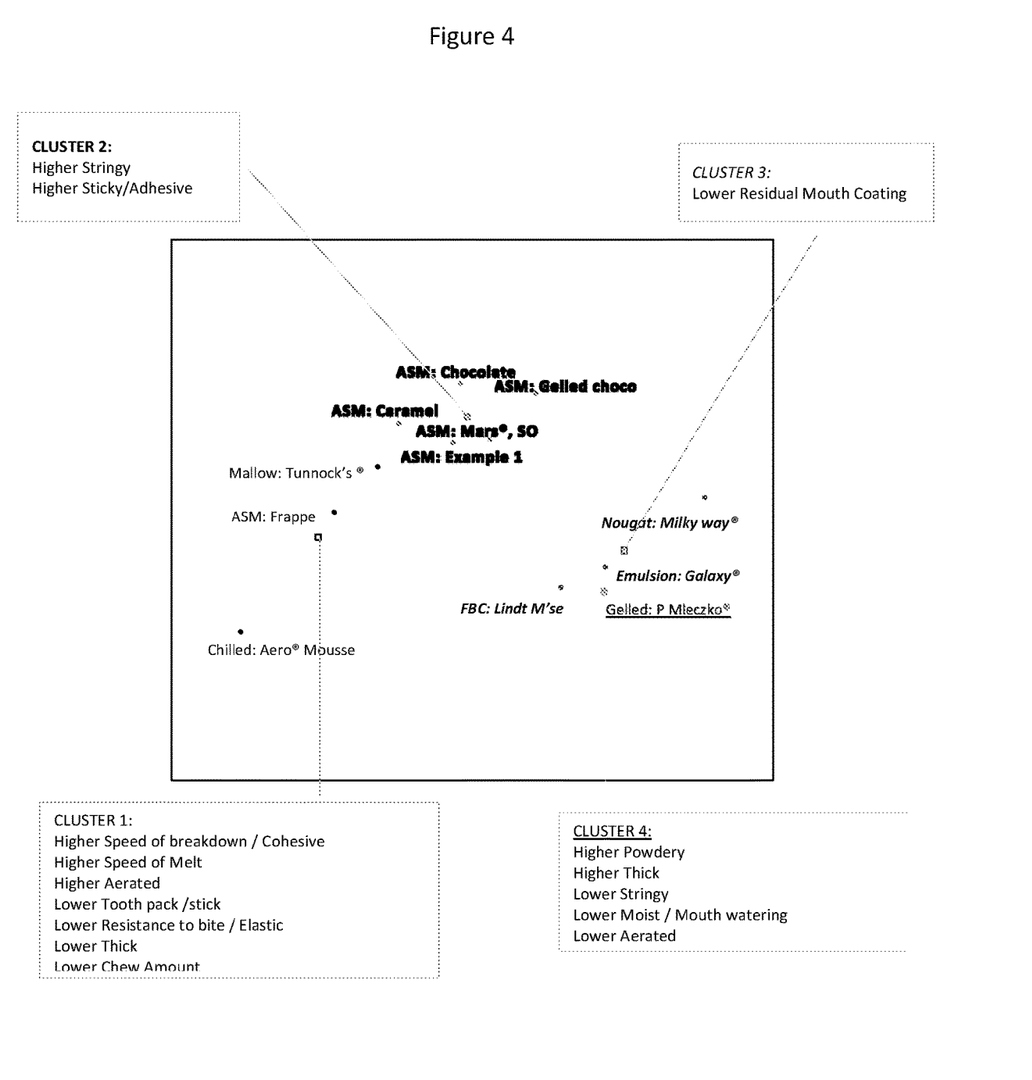
FIG. 4 is a graph showing the correlation Hierarchical Clustering on the principal components of the Correlation PCA (Principal Component Analysis) following sensory testing of a range of products including mousses of the invention.

Using this technique, the best explanation of the sample set obtained was given by 4 clusters as illustrated in FIG. 4.
The results are summarised in the following Table 3.

TABLE 3

| Cluster | Attribute | v. test | p-value |
|---|---|---|---|
| Cluster 1 | Speed of breakdown/cohesion | 2.74 | 0.01 |
| | Speed of melt | 2.42 | 0.02 |
| | Aerated | 2.07 | 0.04 |
| | Toothpack Stick | −2.08 | 0.04 |
| | Resistance to bite elastic | −2.23 | 0.04 |
| | Thick | −2.27 | 0.02 |
| | Chew amount | −2.38 | 0.02 |
| Cluster 2 | Stringy | 2.90 | 0.00 |
| | Sticky adhesive | 2.47 | 0.01 |
| Cluster 3 | Residual mouthcoating | −2.15 | 0.03 |
| Cluster 4 | Powdery | 3.17 | 0.00 |

TABLE 3-continued

| Cluster | Attribute | v. test | p-value |
|---|---|---|---|
| | Thick | 2.56 | 0.01 |
| | Stringy | −1.99 | 0.05 |
| | Moist Mouthwatering | −2.-1 | 0.04 |
| | Aerated | −2.55 | 0.01 |

Mousses of the invention where all contained within a single cluster characterised by higher stringy and higher sticky or adhesive properties. These observations are consistent with the mousse having a tan δ value of 0.95 and above.

The invention claimed is:

1. A shelf-stable mousse comprising (i) an aerated fat-free composition of a whipping agent, water and a sugar syrup, which composition is in admixture with (ii) at least one of a fat-containing substance; wherein the mousse has a water activity of less than 0.75, a hardness of less than 0.8N (measured as the force required to insert a probe to a depth of 7 mm into the mousse), and a loss factor tan δ value of greater than 0.95, wherein the absolute shear modulus G* is from 1-5 k Pa wherein the whipping agent is a protein, wherein the whipping agent is present in an amount of from 0.6 to 1.5 wt % and wherein the mousse contains a fat-containing substance and this is present in the mousse in an amount of from 5-30 wt %.

2. A shelf-stable mousse according to claim 1 wherein the water-activity of the mousse is from 0.4 to 0.7.

3. A shelf-stable mousse according to claim 1 wherein the hardness is less than 0.79N.

4. A shelf-stable mousse according to claim 3 wherein the hardness is from 0.1-0.3N.

5. A shelf-stable mousse according to claim 4 wherein the loss factor tan δ is from 0.95 to 2.

6. A shelf-stable mousse according to claim 1 which has a volume fraction of air of from 30% to 60%.

7. A shelf-stable mousse according to claim 1 which has a stickiness of less than 0.5N.

8. A confectionery product comprising a shelf-stable mousse according to claim 1.

9. A shelf-stable mousse according to claim 1 which comprises a fat-containing substance which is a fat-containing flavouring selected from chocolate, caramel, fruit, nut, vanilla, dairy, malt, or coffee flavouring or combinations thereof.

10. A shelf-stable mousse according to claim 1 wherein the fat-containing substance comprises a non-dairy fat.

11. A shelf-stable mousse according to claim 10 wherein the non-dairy fat is cocoa liquor.

12. A shelf-stable mousse according to claim 11 which has a density of less than 1 g/ml.

13. A shelf-stable mousse according to claim 12 wherein the density is in the range of from 0.50 to 0.8 g/ml.

14. A shelf-stable mousse according to claim 13 which comprises from 10 to 25 wt % water.

15. A shelf-stable mousse according to claim 14 wherein the whipping agent is milk protein, egg protein or a mixture thereof.

16. A shelf-stable mousse of claim 15 wherein the whipping agent is egg protein.

17. A method for preparing a shelf-stable mousse said method comprising:
  i) forming a base syrup from a sugar syrup or solution;
  ii) forming a whipping solution by creating a mixture of a whipping agent, water and sugar syrup;

iii) mixing the base syrup at elevated temperature with the whipping solution to form a mixture;
iv) aerating the mixture of whipping solution and base syrup to form an aerated frappe; and
v) mixing the aerated frappe with a fat-containing substance in solid or liquid form
wherein the mousse has a water activity of less than 0.75, a hardness of less than 0.8N (measured as the force required to insert a probe to a depth of 7 mm into the mousse), and a loss factor tan δ value of greater than 0.95, wherein the absolute shear modulus G* is from 1-5 k Pa wherein the whipping agent is a protein, wherein the whipping agent is present in an amount of from 0.6 to 1.5 wt % and wherein the mousse contains a fat-containing substance and this is present in the mousse in an amount of from 5-30 wt %.

18. A method according to claim 17 wherein the base syrup is formed by heating a sugar syrup or solution to form a syrup having a solids content of 80-85 wt %.

19. A method according to claim 17 wherein in step (ii), a whipping agent is mixed with water and sugar syrup and the mixture allowed to stand for a period of 30 minutes to 2 hours.

20. A method according to claim 19 wherein the aeration in step (iv) is carried out until the density of the frappe is from 0.2 to 0.4 g/ml.

21. A method according to claim 20 which further comprises the step of depositing the mousse into a container.

22. A method according to claim 21 wherein the container is a chocolate shell.

* * * * *